United States Patent [19]

Salee et al.

[11] 4,312,975

[45] Jan. 26, 1982

[54] BISPHENOL-DICARBOXYLIC ACID DIESTER AND COMPOSITIONS THEREOF WITH LINEAR AROMATIC POLYESTER HAVING IMPROVED PROCESSABILITY

[75] Inventors: Gideon Salee, Williamsville; Jerold C. Rosenfeld, Tonawanda, both of N.Y.

[73] Assignee: Hooker Chemicals & Plastics Corp., Niagara Falls, N.Y.

[21] Appl. No.: 45,447

[22] Filed: Jun. 4, 1979

[51] Int. Cl.$^3$ .............................................. C08G 63/12
[52] U.S. Cl. ...................................... 528/176; 560/86; 560/140
[58] Field of Search ................. 560/86, 140; 528/193, 528/206, 209, 176

[56] References Cited

U.S. PATENT DOCUMENTS

| | | | |
|---|---|---|---|
| 3,106,570 | 10/1963 | Jaruzelski et al. | 560/86 |
| 3,345,400 | 10/1967 | Anagnostopoulos et al. | 560/86 |
| 3,498,950 | 3/1970 | Shatz et al. | 528/206 |
| 3,694,490 | 9/1972 | Witt et al. | 560/86 |
| 4,051,106 | 9/1977 | Gouinlock et al. | 528/195 |
| 4,065,432 | 12/1977 | Frazer | 528/193 |
| 4,081,428 | 3/1978 | Thompson | 560/86 |
| 4,126,602 | 11/1978 | Salee | 260/40 R |
| 4,129,546 | 12/1978 | Axelrod et al. | 260/31.8 T |
| 4,182,725 | 1/1980 | Floyd et al. | 560/140 |

OTHER PUBLICATIONS

J. March, *Advanced Organic Chemistry: Reactions, Mechanisms, and structure*, McGraw-Hill, 1963, pp.526-530.
T. W. Solomons, *Organic Chemistry*, John Wiley & Sons, Inc., 1976, p. 491.
F. A. Carey & R. J. Sindberg, *Advanced Organic Chemistry, Part A: Structure and Mechanisms*, Plenum Press, 1977, p. 531.
V. V. Korshak et al, "Polyarylates," *Russian Chemical Reviews*, V. Khimii, ed., April, 1961.
Plastics Materials, J. A. Brydson (1966) p. 336 & 347.

*Primary Examiner*—Maurice J. Welsh
*Attorney, Agent, or Firm*—James F. Mudd; David A. Stein

[57] ABSTRACT

There is disclosed a diester of a bisphenol having two dicarboxylic acid residues wherein the dicarboxylic acid residues terminate in carboxylic acid ester groups derived from a long chain aliphatic monofunctional hydrocarbon alcohol. Compositions of the diester and a linear aromatic polyester of a bisphenol and dicarboxylic acid are characterized by enhanced processability and enhanced hydrolytic stability compared to the polyester.

32 Claims, No Drawings

BISPHENOL-DICARBOXYLIC ACID DIESTER AND COMPOSITIONS THEREOF WITH LINEAR AROMATIC POLYESTER HAVING IMPROVED PROCESSABILITY

BACKGROUND OF THE INVENTION

This invention relates to a diester more particularly to a diester of a bisphenol and a dicarboxylic acid which has utility as a processing aid additive to linear aromatic polyesters. It also includes compositions of enhanced processability and hydrolytic stability comprising a linear aromatic polyester and the diester.

Linear aromatic polyesters derived from dicarboxylic acids (especially aromatic dicarboxylic acids) and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation, and good electrical properties.

While the aforementioned polyesters comprising bisphenol and dicarboxylic acid residues can be processed with present day conventional processing equipment, the operating conditions in the latter required for processing these polyesters is often near the operating limits of the processing equipment entailing costly expenditures of energy in processing the polyesters.

A method known to the art to overcome such difficulties in regard to processing polymers is to incorporate in the polymers processing aid additive. In the case of the present polyesters, many of the processing aid additives employed for other polymers, including other types of polyester, do not provide sufficient enhancement of processability and/or are incompatible with the polyester. In addition, many of the known processing aid additives employed in the art are polymers themselves and hence are relatively difficult and costly to prepare.

In order to form a successful molding resin on a commercial scale, a polymer should be capable of being molded conveniently without significant degradation in physical properties. In this respect, although the aforementioned aromatic polyesters generally display excellent physical and chemical properties, a persistant problem has been their sensitivity to hydrolytic degradation at elevated temperatures. This sensitivity to the combined effects of heat and moisture is also exhibited in commercially available polycarbonate resins as evidenced by the desirability of reducing the water contact of the resin to less than about 0.05% prior to molding. Unfortunately, however, the aromatic polyester resins often display a more pronounced tendency to repidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would limit their commercial utility in applications such as in autoclaves or at elevated temperatures in humid atmospheres.

It is the principal object of this invention to provide a non-polymeric processing aid and hydrolytic stability enhancement agent for linear aromatic polyester substrates which comprise bisphenol and dicarboxylic acid residues.

It is another object of the invention to provide easily processable compositions of improved hydrolytic stability comprising said linear polyester and the processing aid additive.

SUMMARY OF THE INVENTION

The invention is directed to a non-polymeric diester of a bisphenol and a dicarboxylic acid having the structural formula:

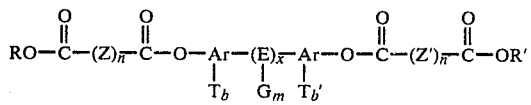

wherein Ar is aromatic, G is alkyl, haloalkyl, aryl, haloaryl, alkylaryl, haloalkylaryl, arylalkyl, haloarylalkyl, cycloalkyl or halocycloalkyl; E is a divalent alkylene, haloalkylene, cycloalkylene, halocycloalkylene, arylene or haloarylene, —O—, —S—, —SO—, —SO$_2$—, —SO$_3$—, —CO—,

or GN<; T and T' are independently selected from halogen; G and OG; m is an integer from 0 to the number of replaceable hydrogen atoms on E; b is an integer from 0 to the number of replaceable hydrogen atoms on Ar; x is 0 or 1; Z and Z' are like or different alkylene groups, —Ar— or —Ar—Y—Ar—; Y is an alkylene group of 1 to 10 carbon atoms, haloalkylene, —O—, —S—, —SO—, —SO$_2$—, —SO$_3$—, —CO—,

or GN<; n and n' are independently selected from integers 0 and 1; and R and R' are independently selected from aliphatic hydrocarbon groups of 8 to 45 carbon atoms.

The invention also includes an improved process for preparing the aforementioned diester.

In another aspect, the present invention is directed to a thermoplastic polymeric composition comprising in admixture (a) a linear aromatic polyester of components comprising a bisphenol and a dicarboxylic acid and (b) from more than about 1% to less than about 50% by weight based on the weight of the polyester of the aforementioned diester. The present diester when admixed in above-indicated proportion, i.e. with a linear aromatic polyester of a bisphenol and a dicarboxylic acid, is found to be substantially compatible with the polyester substrate and to enhance substantially the processability and hydrolytic stability of the polyester.

DETAILED DESCRIPTION OF THE INVENTION AND PREFERRED EMBODIMENTS THEREOF

The Polyester Substrate

The linear aromatic polyester substrate with which the present diester is admixed as a processing aid additive according to the invention can be prepared by condensing a diacyl halide of a dicarboxylic acid, e.g. a diacyl chloride or bromide, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

The bisphenols which can be used in this process are known in the art and correspond to the general formula:

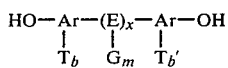

wherein Ar is aromatic, especially a hydrocarbon aromatic group, preferably containing 6-18 carbon atoms (including phenyl, biphenyl and naphthyl); G is alkyl, haloalkyl, aryl, haloaryl, alkylaryl, haloalkylaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. Preferably G and E in the above structural formula, when taken together, do not form a cyclic substituent. The bisphenols generally contain 12 to about 30 carbon atoms, and preferably 12 to about 25 carbon atoms.

Typical examples of bisphenols having the foregoing formula include bisphenol-A [i.e. bis(4-hydroxyphenyl)-2,2-propane], bis(3-hydroxyphenyl)-1,2-ethane, bis(4-hydroxyphenyl)-1,2-ethane as well as the other bisphenols illustrated in G. Salee, U.S. Pat. No. 4,126,602 (issued Nov. 21, 1978) at Column 2, line 68 to Column 3, line 47, the subject matter of said patent being incorporated herein by reference. Representative bisphenols include p,p'-bisphenol and the other bisphenols illustrated in the aforementioned U.S. Pat. No. 4,126,602 of G. Salee at Column 3, lines 47-55. Mixtures of isomers of the foregoing bisphenols and bisphenols can be used also.

The dicarboxylic acids which are useful in this process are also well known and can be represented by the formula:

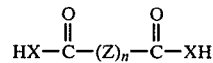

in which X is oxygen or sulfur, Z is alkylene, —Ar'— or —Ar'—Y—Ar'— where Ar' has the same definition as given with respect to the Ar group of the bisphenols, Y is an alkylene, of 1 to 10 carbons, haloalkylene, —O—, —S—, —SO—, —SO$_2$—, —SO$_3$—, —CO—,

or GN<; and n is 0 or 1.

Suitable dicarboxylic acids include aromatic dicarboxylic acids such as phthalic acid, isophthalic acid, and terephthalic acid, as well as the other aromatic dicarboxylic acids illustrated in the aforementioned U.S. Pat. No. 4,126,602 of G. Salee.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

An alternate process for preparing suitable aromatic polyesters, disclosed in U.S. Pat. No. 3,471,441, to Hindersinn et al., the disclosure of which is incorporated herein by reference, comprises the homogeneous reaction of an aliphatic modifier, preferably a glycol of 2 to about 100 carbon atoms, with a diacyl halide of a dicarboxylic acid, followed by an interfacial polymerization of the resultant prepolymer with a bisphenol. Compositions prepared by this process have an aliphatic modifier, i.e. a glycol, incorporated into the structure of the reaction product of the bisphenol and diacid halide, and possess excellent engineering properties such as high impact strength, high modulus, improved moldability, and high softening points.

The bisphenol and dicarboxylic acid components which may be employed in the Hindersinn et al. preparatory process correspond to those described above. The aliphatic modifier is a reactive difunctional component which may be represented by the formula:

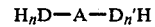

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing formula include ethylene glycol, and other aliphatic modifiers illustrated in the aforementioned U.S. Pat. No. 4,126,602 of G. Salee at Column 4, lines 55-66. Combinations of the above-described aliphatic modifiers can also be employed, usually to obtain special properties.

Solution processes can also be employed in the preparation of suitable aromatic polyesters, such as disclosed in U.S. Pat. Nos. 4,051,107 and 4,051,106, the disclosures of which are incorporated herein by reference.

The polyester components of the invention are preferably prepared by a process, described as melt polymerization, involving an ester interchange, i.e. transesterification reaction, between a diphenolic reactant and a diaryl ester of a dicarboxylic acid carried out in the melt (i.e. without use of a reaction solvent or diluent). Such a process is described in British Pat. No. 924,607, to Imperial Chemical Industries Limited, the disclosure of which is incorporated herein by reference.

A further melt polymerization process which can be used to prepare linear aromatic polyesters suitable for use in this invention is described and claimed in copending application Ser. No. 818,493, filed July 25, 1977, as a continuation-in-part of application Ser. No. 542,635, filed Jan. 20, 1975, now abandoned. This process basically comprises first mixing a bisphenol, a diaryl ester of a dicarboxylic acid and a diol, and then reacting the resulting mixture in the presence of a transesterification catalyst. The disclosure of this application is incorporated herein by reference.

In addition to the aforementioned suitable conventional types of linear aromatic polyesters, the polyester substrate of the invention can also be a linear aromatic polyester comprising bisphenol and dicarboxylic acid residues which contains carboxylate ester end groups derived from a fluoro aliphatic alcohol of 1 to 45 carbon atoms. Such fluoro alkyl carboxylate-terminated polyesters are described in the copending U.S. application of J. C. Rosenfeld and G. Salee, filed of even date with the present application, Ser. No. 45,463, the subject matter of which is incorporated herein by reference.

While the present invention is primarily directed to improving processability and hydrolytic stability of conventional linear aromatic polyesters as described herein above, the invention may also be used to advantage in further improving polyesters which contain structural modifications to improve hydrolytic stability. In this regard the diester additive of the invention may be employed as an additive in the linear aromatic polyesters of the copending U.S. application of J. C. Rosenfeld filed of even date herewith, Ser. No. 45,464. The latter application is directed to a linear aromatic polyester comprising bisphenol and dicarboxylic acid residues which contains carboxylate ester end groups derived from an aliphatic hydrocarbon alcohol of 8 to 45 carbon atoms, said polyester having enhanced hydrolytic stability. The subject matter of the latter copending application is incorporated herein by reference.

The Diester Additive

The diesters of the invention can be prepared by reaction of a dicarboxylic acid reactant, an aliphatic monofunctional alcohol of $C_8$ to $C_{45}$ and a bisphenol.

The aliphatic monofunctional alcohols employed in preparing the present diester correspond in structural formula to ROH and R'OH wherein R and R' have the meaning given in the above structural definition of diester of the invention. Preferably, a single monofunctional aliphatic alcohol is employed in the preparation of the diester so that the groups R and R' in the diester are the same.

The organic residue of the alcohol reactant is generally saturated, i.e. devoid of ethylenic or acetylenic unsaturation. While the organic residue of the alcohol may contain aromatic substituents such as phenyl substituents, and aliphatic ether substituents, e.g. straight chain or branched chain lower alkoxy groups (wherein lower indicates an alkyl group of 1 to 6 carbon atoms) in addition to hydrogen substituents but is devoid of substituents, e.g. hydroxy groups which are capable of undergoing esterification in the reaction employed to prepare the present diester compound.

Preferably the organic residue of the alcohol reactant contains only carbon to hydrogen bonds, i.e. the organic residue is preferably a hydrocarbon residue. The organic residue of the alcohol reactant may be cyclic but, preferably is an acylic aliphatic residue. If acyclic, the organic residue of the alcohol may be a straight chain or branched chain alkyl group. Preferably the organic residue of the monohydroxy alcohol reactant is a straight chain aliphatic residue.

The hydroxy group of the monohydroxy alcohol reactant may be a primary, secondary or tertiary hydroxy group. Preferably a monohydroxy aliphatic alcohol reactant having a primary hydroxy substituent is employed.

The monohydroxy aliphatic alcohol reactant contains from 8 to 45 carbon atoms preferably from 9 to 40 carbon atoms. More preferably the aliphatic alcohol contains 12 to 30 carbon atoms, especially 15 to 20 carbon atoms.

The monohydroxy aliphatic alcohols employed as reagents in accordance with the invention are illustrated by the following representative examples:

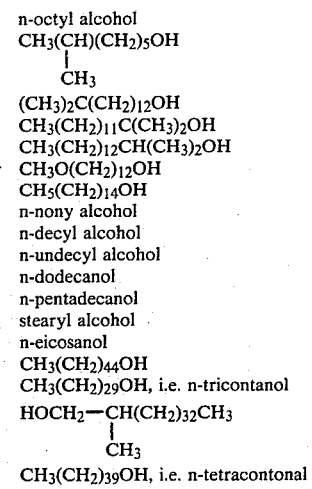

n-octyl alcohol
$CH_3(CH)(CH_2)_5OH$
  |
  $CH_3$
$(CH_3)_2C(CH_2)_{12}OH$
$CH_3(CH_2)_{11}C(CH_3)_2OH$
$CH_3(CH_2)_{12}CH(CH_3)_2OH$
$CH_3O(CH_2)_{12}OH$
$CH_5(CH_2)_{14}OH$
n-nony alcohol
n-decyl alcohol
n-undecyl alcohol
n-dodecanol
n-pentadecanol
stearyl alcohol
n-eicosanol
$CH_3(CH_2)_{44}OH$
$CH_3(CH_2)_{29}OH$, i.e. n-tricontanol
$HOCH_2—CH(CH_2)_{32}CH_3$
       |
       $CH_3$
$CH_3(CH_2)_{39}OH$, i.e. n-tetracontonal Mixtures of these and equivalent monohydroxy aliphatic alcohols can also be employed in the practice of the invention.

The bisphenol employed in preparing the diester compound of the invention can be any of the bisphenols or biphenols described above as suitable for preparation of the polyester substrate in accordance with the above-presented structural formula definition of the bisphenol. Preferably the bisphenol employed to prepare the diester of the invention is bisphenol-A (—Ar—=p-phenylene, T and T'=hydrogen, b=4, E=methylene, G=methyl and m=2 in the above structural for the bisphenol).

The dicarboxylic acid reagent employed in preparing the diester compound of the invention can be any of the dicarboxylic acids used as described above as suitable for preparation of the aforementioned polyesters. Preferably the dicarboxylic acid is chosen so that the dicarboxylic acid residue of the diester is the residue of an aromatic dicarboxylic acid (i.e. n and n'=1, Z and Z'=—Ar— or —Ar—Y—Ar— in the above structural formula of the dicarboxylic acid), especially a terephthalic or isophthalic acid residue.

The diester of the invention can be prepared employing solution or melt (transesterification) techniques which are essentially similar in conditions, e.g. of temperature, pressure, reaction medium and catalyst employed in preparation of the aforementioned polyester.

When a solution mode is employed to prepare the diester of the invention, a diacyl halide of the dicarboxylic acid is employed as the dicarboxylic acid reactant.

When a melt or transesterification preparatory mode is used to prepare the diester, the dicarboxylic acid reactant is a diester of the dicarboxylic acid and a monohydroxy-aromatic compound of the benzene or naphthalene series containing 6 to 20 carbon atoms (such as phenol; o-, m-, or p-cresol; xylenol; a halophenol, e.g. p-chlorophenol 3,5-dibromophenol, a nitrophenol, e.g. o-, m-, or p-nitrophenol, 1-naphthol, 1-hydroxy-4-naphthol and the like). Preferably a diester of the dicarboxylic acid and phenol is employed as the diaryl ester reactant.

In preparing the present diester by reaction of the alcohol, a diacyl halide of the dicarboxylic acid and a bisphenol in accordance a solution mode of preparation the alcohol is reacted with the diacyl halide concurrently with, or preferably prior to, the esterification reaction of the diacyl halide and the bisphenol.

In preparing the present diester by the aforementioned concurrent solution mode of reaction of the bisphenol, the diacyl halide and the alcohol, the alcohol is added to and allowed to react with the diacyl halide at the end, during, or desirably at the beginning of the esterification reaction of the diacyl halide and the bisphenol reactant. In other words, the alcohol reactant of the invention is reacted with the diacyl halide either simultaneously with, or subsequent to, mixing of the bisphenol and the diacyl halide to commence the esterification reaction to obtain the diester of the invention.

In a preferred embodiment of the present solution preparation process, the alcohol is contacted and reacted by esterification with the diacyl halide reactant to substantial completion prior to contact of the diacyl halide reactant with the bisphenol under essentially the same conditions, e.g. of temperature, pressure, solvent and catalyst, as are employed in the concurrent reaction of the diacyl halide, the alcohol and the bisphenol. The preferred solutions technique for preparing the diester provides a more complete reaction of the alcohol, i.e. a more complete conversion of the alcohol to the desired long chain alkyl carboxylate ester end groups in the diester product of the invention.

Desirably when, in accordance with the invention, the diester is prepared by a transesterification or melt reaction technique, the diaryl ester of the dicarboxylic acid is also prereacted, i.e. transesterified with the alcohol prior to transesterification reaction of the diaryl ester with the bisphenol. In other words, a mixture of the alcohol and the diaryl ester is allowed to react to substantial completion prior to the addition of the bisphenol to the reaction mixture containing the diaryl ester reactant and the alcohol.

In carrying out the preparation of the diester by either a solution or transesterification technique it is important to provide a sufficient proportion of the alcohol reactant, since when employed in a sufficient amount the monofunctional alcohol reactant acts as chain termination reagent to inhibit any polymerization reaction between bisphenol and the dicarboxylic acid reactant. Accordingly formation of the diester of the invention is achieved to the exclusion of formation of any polyester of the dicarboxylic acid and the bisphenol by employing in the preparation of the diester about a stoichiometric proportion of the alcohol, the dicarboxylic acid reactant and bisphenol of about 2:2:1. The latter proportion of reactants includes at least about one molar proportion of the alcohol based on the dicarboxylic acid reactant which serves to inhibit formation of the polyester. If desired, a slight excess e.g. up to about a 5 mole percent excess of the alcohol and/or the bisphenol may be used but the use of such excesses of alcohol and bisphenol does not provide any substantial additional benefit in the preparation of the diester and is costly.

The diester product of the invention is useful as a processing aid additive and hydrolytic stability enhancing additive for linear aromatic polyesters of the type described herein above. Addition of the diester to the polyester substantially improves the processability of the molten polyester and enhances the hydrolytic stability of the polyester at the temperatures, e.g. ambient temperature, at which the polyester is ordinarily used, i.e. at ordinary service temperatures of the polyester.

Accordingly, the diester-polyester compositions of the invention have particular utility in preparation of molded polyester articles when ease of processing of the polyester is especially required, for example molded polyester, automotive and electrical equipment parts.

The polyester-diester compositions of the invention may optionally contain other additives such as organic or inorganic fillers, flame retardants, hydrolysis stabilizers and tensile strength stabilizers for the polyester.

The fillers which may be used in the polyester-diester compositions of the invention are preferably particulate fillers such as particulate glass (e.g. chopped glass fiber, glass rovings, glass microballoons or micropheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particular filler employed in the compositions of the invention is in the range of about 5 to about 70 weight percent, preferably about 5 to about 40 weight percent and especially about 8 to about 30 weight percent based on the combined weight of the polyester and the diester additive. The filler employed is preferably inorganic. Generally a particularly good result is obtained employing a particulate glass filler especially glass fiber.

The polyester-diester composition of the invention may also contain in admixture a polymeric additive which further stabilizes the polyester against hydrolysis. Particularly suitable hydrolysis stabilizers for the polyester include the polymeric reaction product of a styrene/maleic anhydride copolymer and a diene rubber as described in G. Salee, U.S. Pat. No. 4,126,602 issued Nov. 21, 1978, (the subject matter of which patent is incorporated herein by refernce), polyphenylene sulfide as described in the copending U.S. application of G. Salee, Ser. No. 819,539, filed July 27, 1977, U.S. Ser. No. 863,556, filed Dec. 22, 1977, Ser. No. 863,555 filed Dec. 22, 1977, and Ser. No. 905,623, filed May 12, 1978 (the subject matter of which applications is incorporated herein by reference), linear aromatic polysulfonates of a bisphenol and a disulfonic acid (as described in the copending U.S. application of G. Salee and J. C. Rosenfeld, Ser. No. 921,026, filed June 30, 1978 (the subject matter of which is incorporated by reference), and the cross-linked acylate-methacrylate polymer of the copending U.S. application of G. Salee Ser. No. 920,891 filed June 30, 1978, (the subject matter of which is incorporated by reference).

As an optional additive which stabilizes the polyester against loss of tensile strength on ageing, the polyester-diester composition of the invention may contain the perfluoroalkenoxy surface active compound described in the copending U.S. application of N. Dachs, Ser. No. 921,027, filed June 30, 1978, the subject matter of which is incorporated by reference.

Flame retardant additives for the polyester which can also be employed as optional additives in the present polyester-diester compositions include the halogen-containing flame retardant agents of the copending U.S. applications of G. Salee Ser. No. 863,556 and Ser. No. 863,381, both filed Dec. 22, 1978, the subject matter of said applications being incorporated herein by reference.

The polyester-diester compositions of the invention are conveniently prepared by addition of the diester to the linear aromatic polyester (and if desired one or more of the aforementioned types of optional additives) prior to, or during processing of the polyester while the polyester is in molten condition. Typically a homogeneous particulate physical mixture of the linear aromatic polyester and the diester is prepared in a ball-mixer or equivalent mixing apparatus. The resultant mixture is subjected to milling in molten condition and is then pressed as a film or molded (by an extrusion or preferably injection molding technique) employing apparatus and techniques which are conventional with thermoplastic resins such as the present linear aromatic polyester. If injection molding of the present composition is desired, it may be desirable to substitute an extrusion molding step for processing of the molten composition in a mill prior to the final injection molding of the composition. Films, as well as various shaped molded articles such as rods, bars, ring, etc. can be prepared from the present thermoplastic polymeric compositions.

In general the amount of diester compound which is employed to enhance the processability of the polyester according to the invention is above about one weight percent to less than about 50 weight percent based on the weight of the polyester. Preferably about 3 to about 30 weight percent and especially about 5 to about 20 weight percent of the diester based on the weight of polyester is employed in preparing the diester-polyester compositions of the invention.

The following examples further illustrate the various aspects of the invention but are not intended to limit it.

Various modifications can be made in the invention without departing from the spirit and scope thereof. Where not otherwise specified in this specification and claims, temperatures are given in degrees Centigrade, and all parts, proportions and percentages are by weight.

EXAMPLE 1

(Preparation By Solution Polymerization Of A Bisphenol-A-Isophthalate-Terephthalate Linear Aromatic Polyester)

A 100 gallon reaction vessel equipped with mechanical agitation means and a 50 gallon addition vessel connected to the reaction vessel are dried by heating to 150° C. and purging with dry nitrogen gas. The reaction vessel is charged with 500 pounds of methylene chloride solvent which had been dried by passing it through molecular sieves.

Bisphenol-A (21,668 grams, 94.864 moles), isophthaloyl chloride (16,567 grams, 81.6 moles), terephthaloyl chloride (2,924 grams, 14.4 moles) and para tertiary butyl phenol (341.3 grams, 2.27 moles) are charged to the 100 gallon reaction vessel. Then 44.2 pounds of freshly distilled triethylamine catalyst is charged to the 50 gallon addition vessel. Over a period of about 5 hours the triethylamine catalyst is added with agitation to the mixture in the 100 gallon reaction vessel under pressure at a temperature of about 8°–15°. The addition vessel is washed with 15 gallons of methylene chloride and the methylene wash containing residual catalysts is added to the 100 gallon reaction vessel. The polymerization reaction mass is agitated at about ambient temperature for about 3 hours after completion of the catalyst addition. The basic reaction mixture is then neutralized by the addition of 600 millileters of concentrated aqueous HCl which has been diluted with about 10 gallons of water. The resulting neutralized reaction mass is allowed to stratify into an upper aqueous layer and a lower organic layer. The lower organic layer is withdrawn and washed free of chloride anion with deionized water.

The washed polymerization mixture is then filtered through a 25 micron filter and divided into equal portions by volume. Each portion is diluted by addition of 200 pounds of methylene chloride. Over a period of about two hours and 50 minutes 130 pounds of isopropyl alcohol is added with agitation to each portion of the reaction mixture. Substantially all of the methylene chloride is then distilled from each portion of the reaction mixture. The polyester product which precipitates is recovered by filtration from each portion of the reaction mixture and combined after being dried in a vacuum oven the polyester product is obtained in a yield of about 31,000 grams. There is thus obtained a polyester of bisphenol-A, isophthalic acid and terephthalic acid containing isophthalate groups and terephthalate groups in a molar proportion of about 85:15. The polyester product has an intrinsic viscosity of about 0.65 (as measured at 30° in symmetrical tetrachloroethane solution at a concentration of about 0.5 percent).

The polyester product is pelletized by melt extrusion from a Haake Screw Extruder operating under the following conditions:

| RPM | ZONE 1 TEMP. | ZONE 2 TEMP. | ZONE 3 TEMP. | ZONE 4 TEMP. | DIE MELT TEMP. | TORQUE | AMPS |
|---|---|---|---|---|---|---|---|
| 100 | 290° | 290° | 290° | 290° | 320° | 5000-6000 m.-g. | 30-35 |

The extrudate of the product is divided into pellets which are dried for about 2 hours at 120°. The dried pellets are then injection molded in an Arburg 221E/150 Model injection molding apparatus operating at the following conditions:

| | |
|---|---|
| Barrel Temperature | 630° F. |
| Mold Temperature | 250° F. |
| Injection Pressure | 18,870 psi |

The injection molded polyester product is tested for the physical properties of tensile strength, tensile modulus, Izod impact resistance, and heat distortion temperature (264 psi). This data is presented in the Table below. The hydrolytic stability of the injection molded polyester product is determined by immersing the product in boiling water for seven days and thereafter measuring the tensile strength and the tensile modulus of the product. A comparison of the tensile strength and tensile modulus before and after emersion of the product is indicative of the hydrolytic stability of the product. This data is also presented in the Table below.

EXAMPLE 2

(Preparation Of A Bisphenol-A Dicarboxylic Acid Diester Having Long Chain Alkyl Carboxylate Terminations)

Under an atmosphere of dry nitrogen gas stearyl alcohol (270.5 grams, 1 mole) and terephthaloyl chloride (203.0 grams, 1 mole) is charged to a 5 liter Morton flask equipped with an addition funnel, a nitrogen inlet for dry nitrogen gas, mechanical agitation device, a condenser, a thermometer and a drying tube. Dried freshly distilled methylene chloride (3000 milliliters) is also charged to the reaction flask. Freshly distilled triethylamine catalyst (101.2 grams, 1 mole) is charged to the addition funnel and added gradually over a period of about 1 hour and 6 minutes to the reaction mixture maintained at 15°-21°. The resultant mixture is agitated for about 16 hours at about ambient temperature to complete the reaction of the stearyl alcohol and the diacyl chloride. Bisphenol-A (114.2 grams, 0.5 moles) is then added to the reaction mixture. Additional freshly distilled dry triethylamine catalyst (107 grams, 1.03 mole) is then charged through the addition funnel gradually to the reaction mixture over a period of one hour and 15 minutes while the reaction mixture is maintained under agitation at a temperature of about 17°-21°. Agitation of the reaction mass is continued at ambient temperature for about 3 hours on completion of the catalyst addition. The reaction mass is then transferred to a 5 liter separatory flask which is equipped with a mechanical agitation device. A mixture of 800 milliliters of distilled water and 10 milliliters of concentrated aqueous hydrochloric acid is added to the reaction mass under agitation to neutralize the catalyst. The resultant mixture is allowed to stratify and the lower organic layer which separates is recovered. The resultant organic layer is washed free of chloride ion with deionized water. The methylene chloride solvent is allowed to evaporate from the mixture at ambient temperature. The resultant solid product is dried in a vacuum oven at 100° for 2 hours. The yield of the resultant solid product is about 100% of theory. The molecular weight of the product as determined by vapors phase osmometry is 990±5%. The theoretical molecular weight, i.e. formula weight, of the product having the structural formula:

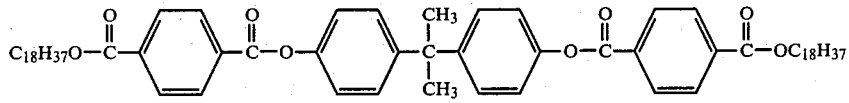

is 1026 indicating that the present product corresponds to the above structural formula.

EXAMPLE 3

The polyester of Example 1 is dried for 4 hours at 120° in air circulating oven. The diester of Example 2 is dried at 80° for 4 hours in the aforementioned oven. The polyester and the diester are physically mixed and pelletized by melt-extrusion from a Haake Screw Extruder substantially as described in Example 1. The Haake Screw Extruder operates under the following conditions:

| RPM | ZONE 1 TEMP. | ZONE 2 TEMP. | ZONE 3 TEMP. | ZONE 4 TEMP. | DIE MELT TEMP. | TORQUE | AMPS |
|---|---|---|---|---|---|---|---|
| 100 | 290° | 290° | 290° | 210° | 310° | 5000-7000 m.-g. | 20-40 |

The pale yellow extrudate which is obtained is pelletized substantially as described in Example 1 and the pellets are dried for 2 hours at 120°. The pelletized product is then injection molded on the Arburg apparatus of Example 1 under the following operating conditions:

| | |
|---|---|
| Barrel Temperature | 610° F. |
| Mold Temperature | 250° F. |
| Injection Pressure | 23,300 psi |

The product is tested for the physical properties of tensile strength, tensile modulus, Izod impact resistance, and heat distortion temperature substantially as described in Example 1. This data is presented in the Table below. The product is also tested for hydrolytic stability substantially as described in Example 1 and this data is also presented in the Table below.

EXAMPLE 4

The procedure of Example 1 is repeated substantially as described in preparing a blend of the polyester of Example 1 and the diester of Example 2 except that the pelletization of the product prior to injection molding is carried out by melt fusion in a mill instead of by extrusion. About 600 grams of the polyester of Example 1 is dried at 120° C. for about 4 hours in an air circulating oven. About 30 grams (5% by weight based on the weight of the polyester) of the diester of Example 2 are dried for 4 hours at 80° in an aforementioned air circulating oven.

Both the polyester and the diester in particulate form are hand mixed and milled to a fused sheet on a two-roll mill operating with the front roll temperature of 450° F. and a back roll temperature of 410° F. The resultant sheet was cut into pieces of about 2 inch width by 2 inch length and these are fed to a granulated to form 3 millimeter in diameter pellets. The resultant pellets are dried at 120° for 2 hours and molded in the Arburg injection molding apparatus of Example 1 under the following operating conditions:

| Barrel Temperature | 590° F. |
|---|---|
| Mold Temperature | 250° F. |
| Injection Pressure | 19,980 psi |

| Barrel Temperature | 590° F. |
|---|---|
| Mold Temperature | 250° F. |
| Injection Pressure | 15,540 psi |

The aforementioned injection molded product specimens are tested for the properties of tensile strength, tensile modulus, Izod impact resistance, and heat distortion temperature substantially as described in Example 1. This data is presented in the Table below. The injection molded product is also tested for hydrolytic stability substantially as described in Example 1 and this data is also presented in the Table below.

EXAMPLE 5

The procedure of Example 4 is repeated substantially as described in preparing a mixture of the polyester of Example 1 (600 grams) and the diester of Example 2 (60 grams, corresponding to 10% by weight based on the weight of the polyester).

The next example the operating conditions employed in injection molding of the product in the Arburg apparatus of Example 1 are as follows:

| Barrel Temperature | 580° F. |
|---|---|
| Mold Temperature | 250° F. |
| Injection Pressure | 16,650 psi |

The resultant injection molded product specimens are tested for tensile strength, tensile modulus, Izod impact strength, heat distortion temperature and hydrolytic stability substantially as described in Example 1 and this data is also presented in the Table below.

TABLE

| COMPOSITION OF: | EXAMPLE 1 | EXAMPLE 3 | EXAMPLE 4 | EXAMPLE 5 |
|---|---|---|---|---|
| Polyester of Example 1 | 1000 g. | 600 g. | 600 g. | 600 g. |
| Diester of Example 2 | — | 6 g. (1% based on polyester) | 30 g. (5% based on polyester) | 60 g. (10% based on polyester) |
| Processing (Injection Molding) Conditions in Arburg Apparatus: | | | | |
| Barrel Temperature (°F.) | 630° | 610° | 590° | 580° |
| Mold Temperature (°F.) | 250° | 250° | 250° | 250° |
| Injection Pressure (psi) | 18,870 | 23,310 | 19,980* | 16,680 |
| Physical Properties: | | | | |
| Izod Impact Resistance ft-lb/in. | 6.2 | 6.4 | Not measured | 2.2 |
| Heat Distortion Temperature °C. | 159.8° | 160° | 144° | 131.4° |
| Heat Distortion Temperature °F. | 319.6° | 320° | 291.2° | 268.5° |
| Tensile Strength, psi | 9950 | 10,016 | 10,300 | 11,000 |
| Tensile Modulus, psi × $10^5$ | 3.24 | 3.14 | 3.28 | 3.53 |
| Subsequent to Immersion of Product in Boiling Water: | | | | |
| Tensile Strength, psi | 3000 | Not measured | 9800 | 11,450 |
| Tensile Modulus, psi × $10^5$ | 3.42 | Not measured | 3.18 | 3.65 |

*Injection molded specimens for testing of Izod Impact Resistance and Heat Distortion Temperature are separately prepared employing the aforementioned conditions of Barrel Temperature, Mold Temperature and on Injection Pressure of 15,540 psi.

The specimen bars prepared by the foregoing injection molding procedure are reserved for testing of tensile strength, tensile modulus, heat distortion temperature and hydrolytic stability properties of the product. An additional portion of the pelletized product is molded into specimen bars for testing for Izod impact strength under the following injection molding conditions in the aforementioned Arburg injection molding apparatus:

In the data of the foregoing Table the ability to use substantially lower processing conditions (particularly a lower Barrel Temperature and Injection Pressure) in processing the compositions of Examples 4 and 5 (as compared to compositions of Examples 1 and 3) indicates that the compositions of the invention containing more than about 1% by weight of the diester based on the polyester (as illustrated by the compositions of Examples 4 and 5) have enhanced processability as compared to the pure polyester.

Comparison of the retention of tensile strength on immersion in boiling water for seven days between the compositions of invention (as illustrated by the composition of Examples 4 and 5) and the composition of Example 1 (i.e. pure polyester) indicates whereas the latter composition looses about 70% of its original tensile strength (i.e. its tensile strength prior to immersion under comparable boiling water immersion). The compositions of the invention lose at most no more than about 4.9% of their tensile strength upon corresponding immersion in boiling water. This substantial retention of tensile strength on immersion in boiling water indicates the enhanced hydrolytic stability of the compositions of the invention as compared to the hydrolytic stability of the pure, i.e. polyester.

The invention has been described in the above specification and illustrated by reference to specific embodiments in the illustrative examples. However, it is to be understood that these embodiments are not intended to limit the invention since, as illustrated, changes and modifications in the specific details disclosed hereinabove can be made without departing from the scope or spirit of the invention.

What is claimed is:

1. A diester of a bisphenol and a dicarboxylic acid having the structural formula:

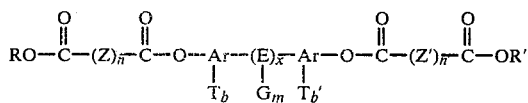

wherein Ar is aromatic, G is alkyl, haloalkyl, aryl, haloaryl, alkylaryl, haloalkylaryl, arylalkyl, haloarylalkyl, cycloalkyl or halocycloalkyl; E is a divalent alkylene, haloalkylene, cycloalkylene, halocycloalkylene, arylene or haloarylene, —O—, —S—, —SO—, —SO$_2$—, —SO$_3$—, —CO—,

or GN<; T and T' are independently selected from halogen, G and OG; m is an integer from 0 to the number of replaceable hydrogen atoms on E; b is an integer from 0 to the number of replaceable hydrogen atoms on Ar; x is 0 or 1; Z and Z' are like or different groups selected from the group consisting of —Ar'— and —Ar'—Y—Ar'— where Ar' has the same meaning as Ar; Y is an alkylene group of 1 to 10 carbon atoms, haloalkylene, —O—, —S—, —SO—, —SO$_2$—, —SO$_3$—, —CO—,

or GN<; n and n' are independently selected from integers 0 and 1; and R and R' are independently selected from aliphatic hydrocarbon groups of 8 to 45 carbon atoms.

2. The diester of claim 1 wherein n and n'=1 and —Ar'— is an aromatic radical of the benzene or naphthalene series containing 6 to 20 carbon atoms.

3. The diester of claim 2 wherein Z and Z' are —Ar'— and —Ar'— contains only hydrogen to carbon bonds.

4. The diester of claim 3 wherein —Ar'— is an m-phenylene or p-phenylene group.

5. The diester of claim 4 wherein Z and Z' represent identical organic groups.

6. The diester of claim 1 wherein —Ar— is p-phenylene, T and T' are hydrogen, b is 4, E is methylene, G is methyl, X is 0, and m is 2.

7. The diester of claim 6 wherein R and R' represent saturated aliphatic hydrocarbon groups.

8. The diester of claim 7 wherein R and R' represent the same aliphatic hydrocarbon groups.

9. The diester of claim 8 wherein R and R' are acyclic aliphatic hydrocarbon groups of 9 to 40 carbon atoms.

10. The diester of claim 9 wherein R and R' are straight chain acyclic aliphatic hydrocarbon groups of 12 to 30 carbon atoms.

11. The diester of claim 10 wherein R and R' are aliphatic hydrocarbon groups of 15 to 20 carbon atoms.

12. The diester of claim 11 wherein n and n' are 1; Z and Z' represent a m-phenylene or p-phenylene group and R and R' are n-stearyl groups.

13. The diester of claim 12 wherein Z and Z' are a m-phenylene group.

14. The diester of claim 12 wherein Z and Z' are a p-phenylene group.

15. In the preparation of a diester by reaction of a bisphenol and an aromatic dicarboxylic acid diacyl halide, the improvement which comprises forming a mixture of the diacyl halide with a monofunctional aliphatic alcohol of 8 to 45 carbon atoms and completing esterification of said mixture prior to any reaction of the bisphenol with the diacyl halide, the diacyl halide, the alcohol and the bisphenol being charged in about stoichiometric proportions.

16. The process of claim 15 wherein the diacyl halide is isophthaloyl chloride, terephthaloyl chloride or mixtures thereof, the aliphatic alcohol is stearyl alcohol and the bisphenol is bisphenol-A.

17. A thermoplastic polymeric composition comprising in admixture (a) a linear aromatic polyester of components comprising a bisphenol and a dicarboxylic acid and (b) greater than about 1 weight percent to less than about 50 weight percent based on the weight of said polyester, of the diester of claim 1.

18. The composition of claim 17 wherein said dicarboxylic acid of the polyester has the formula:

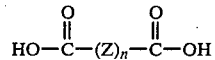

wherein Z is alkylene, —Ar— or —Ar—Y—Ar— where Ar is aromatic, Y is alkylene, haloalkylene, —O—, —S—, —SO$_2$—, —SO$_3$—, —CO—,

or GN<, wherein G is alkyl, haloalkyl, aryl, haloaryl, alkylaryl, haloalkylaryl, arylarlkyl, haloarylalkyl, cycloalkyl or cyclohaloalkyl; and n" is 0 or 1.

19. The composition of claim 18 wherein said dicarboxylic acid of the polyester is an aromatic dicarboxylic acid.

20. The composition of claim 19 wherein said aromatic dicarboxylic acid of the polyester is selected from the group consisting of isophthalic acid, terephthalic acid, and mixtures thereof.

21. The composition of claim 20 wherein said bisphenol of the polyester has the formula:

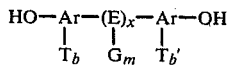

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

22. The composition of claim 21 wherein the bisphenol of the polyester is bisphenol-A.

23. The composition of claim 22 wherein the diester is the diester of claim 14.

24. The composition of claim 17 wherein said linear aromatic polyester includes an aliphatic modifier.

25. The composition of claim 24 wherein said aliphatic modifier is a glycol of 2 to 100 carbon atoms.

26. The composition of claim 25 wherein said glycol is selected from the group consisting of neopentyl glycol, diethylene glycol, ethylene glycol, and mixtures thereof.

27. The composition of claim 1 wherein the aromatic polyester is prepared by a melt polymerization technique.

28. The composition of claim 17 which also includes a filler material.

29. The composition of claim 28 wherein said filler material is particulate glass.

30. The composition of claim 29 wherein the filler material is glass fiber present in an amount of about 5 to about 70 weight percent based on the combined weight of the polyester and the diester.

31. The composition of claim 17 wherein the diester is present in an amount of from about 3 to about 30 weight percent of the polyester.

32. The composition of claim 31 wherein the diester is present in an amount of from about 5 to about 20 weight percent of the polyester.

* * * * *